United States Patent [19]

Sutton et al.

[11] Patent Number: 5,036,259
[45] Date of Patent: Jul. 30, 1991

[54] DYNAMIC FOCUS SYSTEM FOR CRT DISPLAY

[75] Inventors: Leroy A. Sutton, Wheeling; Norman E. Phoenix, Chicago, both of Ill.

[73] Assignee: Zenith Electronics Corporation, Glenview, Ill.

[21] Appl. No.: 621,489

[22] Filed: Nov. 30, 1990

[51] Int. Cl.5 .......................... G09G 1/04; H01J 29/58
[52] U.S. Cl. ........................................ 315/382; 315/370
[58] Field of Search ................................. 315/382, 370

[56] References Cited
U.S. PATENT DOCUMENTS 4,560,910 12/1985 Midland ............................... 315/382
4,622,498 11/1986 Lester .................................. 315/382

Primary Examiner—Gregory C. Issing

[57] ABSTRACT

A dynamic focus sustem for CRT display processes horizontal and vertical rate signals derived from the horizontal and vertical deflection systems of the CRT display. The output signal is processed in part by a common base amplifier and an interactively coupled boot-strapped emitter follower to substantially increase signal handling capability. A diode clamp network is simultaneously driven by composite horizontal and vertical rate dynamic focus signals as well as a DC static voltage and vertical rate parabolic signal to facilitate easy adjustment and setup of the CRT display. The vertical parabolic signal is derived by a single amplifier stage simultaneously driven by vertical deflection and vertical yoke signals. The horizontal parabola amplifier is operated class B to minimize device power and supply voltage needed, and the common base operation of the horizontal amplifier permits the use of lower voltage devices. The composite horizontal and vertical signal and the vertical rate parabolic signal are separately capacitor coupled to the diode clamp to minimize device power and required supply voltage in their respective amplifier circuits.

15 Claims, 3 Drawing Sheets

DYNAMIC FOCUS SYSTEM FOR CRT DISPLAY

FIELD OF THE INVENTION

This invention relates generally to cathode ray tube display systems and particularly to those used in computing systems and television receivers.

BACKGROUND OF THE INVENTION

In most computing systems, one or more display monitors are utilized to provide a visual input/output capability. Such display monitors are similar in many respects to conventional television receiver displays. Thus, many technologies, including the present invention, may be applied effectively to both. In both systems, a cathode ray tube (CRT) includes an evacuated envelope usually made of high-strength glass. The envelope includes a generally flat or slightly curved faceplate or viewing screen together with a funnel shaped bell and extending neck. The interior side of the faceplate supports a phosphor screen. In monochrome displays, a single electron gun is supported within the CRT neck and is directed toward the phosphor screen. The electron gun produces a beam of electrons which are directed toward the faceplate striking the phosphor screen and causing visible light to be emitted therefrom. In color display systems, a plurality of electron guns are used together with a phosphor screen which supports plural areas of phosphors having differing color light emitting characteristics. A shadow mask or similar structure is interposed between the electron guns and the phosphor screen to cause each of the electron guns to stimulate an associated type of colored light emitting phosphor.

Whether the display system is monochrome or color, the electrons emanating from the electron gun or guns form a CRT beam which is scanned in both the horizontal and vertical directions across the faceplate to form a raster. In most instances, the horizontal scan system is operative at a higher frequency than the vertical scan system. Thus, the horizontal scan moves the electron beam rapidly from side to side across the faceplate while the vertical scan system causes the successive horizontal scans to be moved progressively from top to bottom to complete a display frame and form the raster.

In the majority of the presently used display systems, electron beam scanning is accomplished by electromagnetic deflection of the CRT beam. A deflection yoke is supported upon the CRT envelope between the electron guns and the faceplate. The deflection yoke supports a plurality of deflection coils which are coupled to the horizontal and vertical scan systems. Horizontal and vertical scan signals provided by the respective scan systems are coupled to the windings of the deflection yoke to produce corresponding electromagnetic fields which bend the electron beam and thereby direct it to the desired portion of the CRT faceplate. Both the horizontal and vertical scan signals include longer duration sloped scan portions followed by shorter duration high amplitude retrace portions. The latter are utilized at the completion of each respective scan interval to return the electron beam to its starting position. In addition, the retrace portion of the horizontal scan signal is used to develop the high voltage necessary to accelerate the electron beam toward the CRT faceplate.

The character of the image displayed in a CRT display system results from variation or modulation of the intensity of the scanned CRT electron beam. This intensity modulation must be properly timed or synchronized to the horizontal and vertical rate scanning of the raster. Thus, as the electron beam is scanned across the faceplate to form a raster, the desired portions of the faceplate are illuminated by synchronized modulation of the electron beam to provide the desired image.

One of the primary objectives of such CRT display systems is the production of a sharp finely detailed display image. Toward this end, practitioners in the display system art exercise great effort directed at providing drive systems for the CRT beam intensity modulation which preserve high frequency resolution and sharp rise and fall times of the intensity modulation signal. In addition, the sharpness or crispness of the displayed image is also determined in part by the performance of the CRT display device itself. One of the important determinants in the quality of image is found in the degree to which the CRT beam is accurately focused upon the phosphor display screen. To properly focus the CRT beam, focus electrodes are supported within the neck portion of the CRT which when energized produce the desired electrostatic field which acts upon the CRT beam to obtain focus. Because the CRT beam source is generally centered within the CRT neck and is generally aligned with the center of the CRT display screen, a reference center focus or "static focus" is obtained by coupling the focus electrodes to a source of DC voltage.

While center or static focus is easily obtained, the geometry of the typical cathode ray tube introduces focus error as the CRT beam is scanned in the horizontal and vertical directions. Most, if not all, cathode ray tubes are fabricated with faceplates having radii of curvature which are substantially greater than the distances from their faceplates to their electron gun apertures of their CRT beam sources. As a result, an inherent focus error is created which generally increases off-center distance. The more recent introduction of CRT display systems utilizing cathode ray tubes having virtually flat faceplates has further increased the significance of this focus error.

Because of the desire to display a sharp crisp image over the entire faceplate area, practitioners in the art have been led to develop various dynamic focus systems which attempt to adjust CRT beam focus as the CRT beam is scanned across the faceplate. While the detailed structures of such systems vary substantially, most attempt to use the horizontal and vertical scan signals to derive dynamic focus signals having a parabolic character. It has been found that the addition of parabolic focus signals at the horizontal and vertical scan rates to the static or DC focus provides substantial improvement of CRT beam focus.

While the basic task of dynamic focus correction is relatively straightforward to understand, the achievement of quality dynamic focusing in an efficient, cost effective and high performance manner is not. In addition, the task of dynamic focus correction is further exacerbated by cathode ray tube manufacturing tolerance variation as well as certain defocusing effects within the CRT beam deflection fields.

There remains, therefore, a continuing need in the art for evermore effective, efficient and lower cost high quality dynamic focus systems.

Accordingly, it is a general object of the present invention to provide an improved CRT display system. It is a more particular object of the present invention to provide an improved dynamic focus system for CRT displays. It is a still more particular object of the present invention to provide an improved CRT dynamic focus system which is effective and relatively inexpensive to produce.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
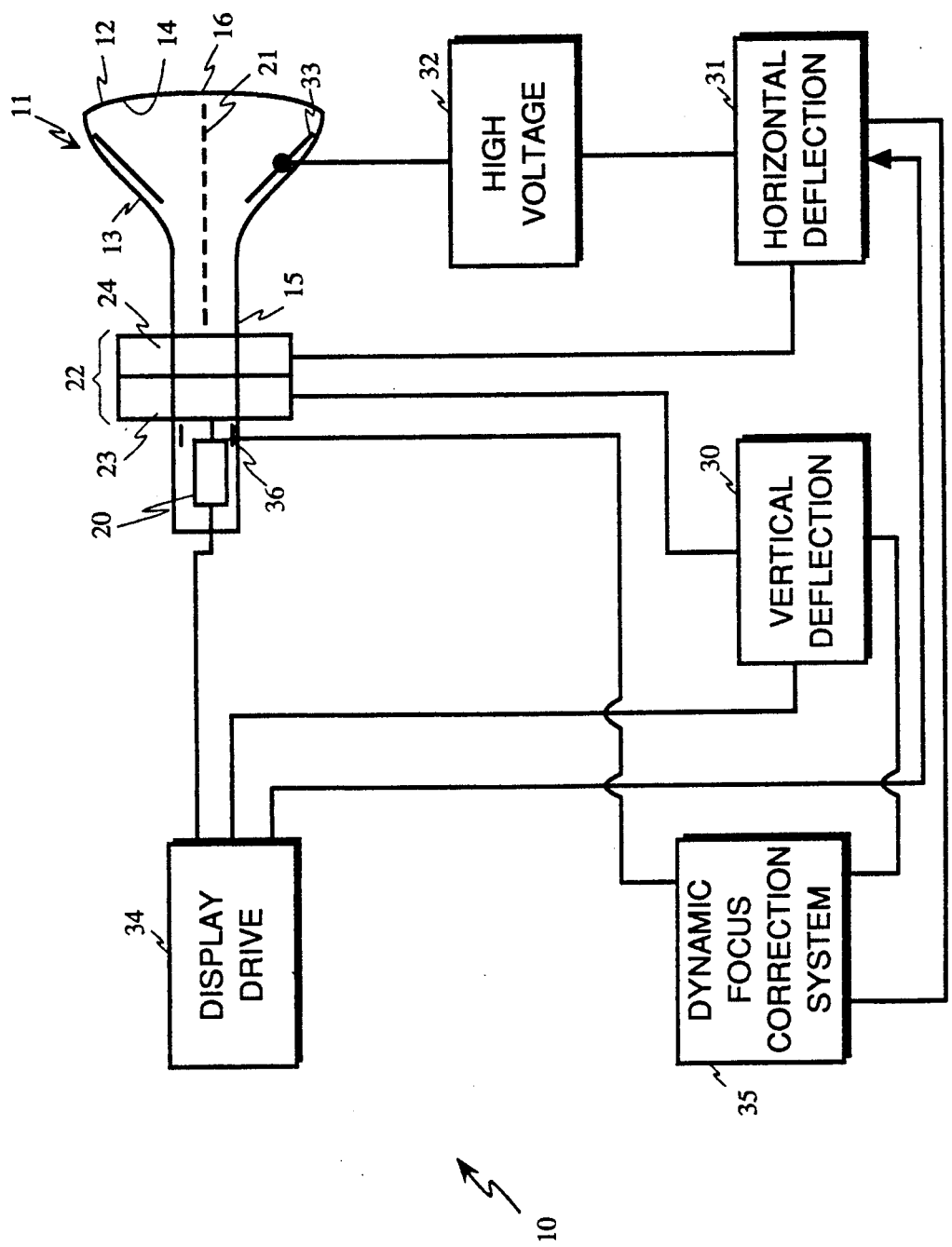
FIG. 1 sets forth a block diagram of a CRT display system utilizing the present invention dynamic focus system.

FIG. 1 sets forth a block diagram of a CRT display generally referenced by numeral 10. Display 10 includes a cathode ray tube 11 having a faceplate 12, a tapered funnel portion 13 and a neck portion 15. Faceplate 12, funnel 13 and neck 15 are generally formed of high strength glass material. Faceplate 12 further includes a phosphor screen 14 supported upon its interior surface. An electron gun assembly 20 constructed in accordance with conventional fabrication techniques is supported within neck 15 and produces a CRT beam 21 which is directed toward faceplate 12. It should be noted that the present invention may be used with both monochrome and color displays. Accordingly, electron gun assembly 20 and CRT beam 21 may be either monochrome or color. For ease of understanding, the descriptions which follow should be understood to apply to either. A conventional deflection yoke 22 includes a vertical yoke 23 and a horizontal yoke 24 each having respective vertical and horizontal deflection coils. A high voltage electrode 33 and a focus electrode 36 each constructed in accordance with conventional fabrication techniques are also supported within the interior of CRT 11.

A conventional vertical deflection system 30 is coupled to vertical yoke 23 of deflection yoke 22. A horizontal deflection system 31, also constructed in accordance with conventional fabrication techniques, is coupled to horizontal yoke 24 of yoke 22. A conventional high voltage system 32 is coupled to horizontal deflection system 31 and high voltage electrode 33 within CRT 11. A display drive 34 which should be understood to include conventional systems for producing electron gun operating and drive signals is coupled to electron gun 20. In addition, display drive 34 produces conventional horizontal and vertical deflection synchronizing signals which are coupled respectively to vertical deflection system 30 and horizontal deflection system 31. A dynamic focus system 35 constructed in accordance with the present invention and described below in greater detail is coupled to focus electrode 36 and to vertical deflection system 30 and horizontal deflection system 31.

In operation, display drive 34 produces a plurality of operating and drive signals which are applied to electron gun assembly 20 to produce an intensity modulated CRT beam 21 which is generally directed at faceplate center 16 of faceplate 12. As mentioned, CRT beam 21 may be either the single electron beam of a monochrome display or the plural electron beam of a color display. In either case, vertical deflection system 30 includes conventional deflection circuitry for generating vertical rate deflection signals which when applied to vertical yoke 23 produce corresponding electromagnetic deflection fields which are operative upon CRT beam 21 to scan CRT beam 21 from top to bottom on faceplate 12. Horizontal deflection system 31 includes conventional horizontal deflection circuitry for generating horizontal deflection signals which when applied to horizontal yoke 24 cause CRT beam 21 to be scanned upon faceplate 12 from left to right. The horizontal deflection signal produced by horizontal deflection system 31 includes a generally linear scan signal interleaved with a short duration high amplitude retrace signal. The latter is coupled to high voltage system 32 to produce a high voltage potential applied to electrode 33 to accelerate the electrons within CRT beam 21 toward phosphor screen 14 with sufficient energy to produce visible light upon impact therewith. In further accordance with conventional fabrication techniques, display drive 34 produces synchronizing signals which are operative upon vertical and horizontal deflection systems 30 and 31 to properly synchronize the scanning of faceplate 12 to the intensity modulation of CRT beam 21 and produce a correctly displayed image.

Focus system 35, by means set forth in greater detail, produces a DC or static focus voltage which is applied to focus electrode 36 of CRT 11. The magnitude of static focus voltage produced by focus system 35 is selected to optimally focus CRT beam 21 at faceplate center 16. In addition, dynamic focus system 35 receives vertical deflection rate signals from vertical deflection system 30 and horizontal deflection rate signals from horizontal deflection system 31 which are processed in accordance with the present invention and as described below in greater detail to produce a composite horizontal and vertical dynamic focus correction signal. The correction signal is applied to focus electrode 36 of cathode ray tube 11 to compensate for the above-described focusing errors and variations of CRT beam 21.

Thus, in the manner described below in greater detail, the composite dynamic focus correction signal produced by focus system 35 includes a horizontal scan rate component which compensates for focus errors produced by the left to right scanning of faceplate 12 together with a vertical scan rate component which compensates for focus errors created as the CRT beam is scanned from top to bottom across faceplate 12.

Figure 2:
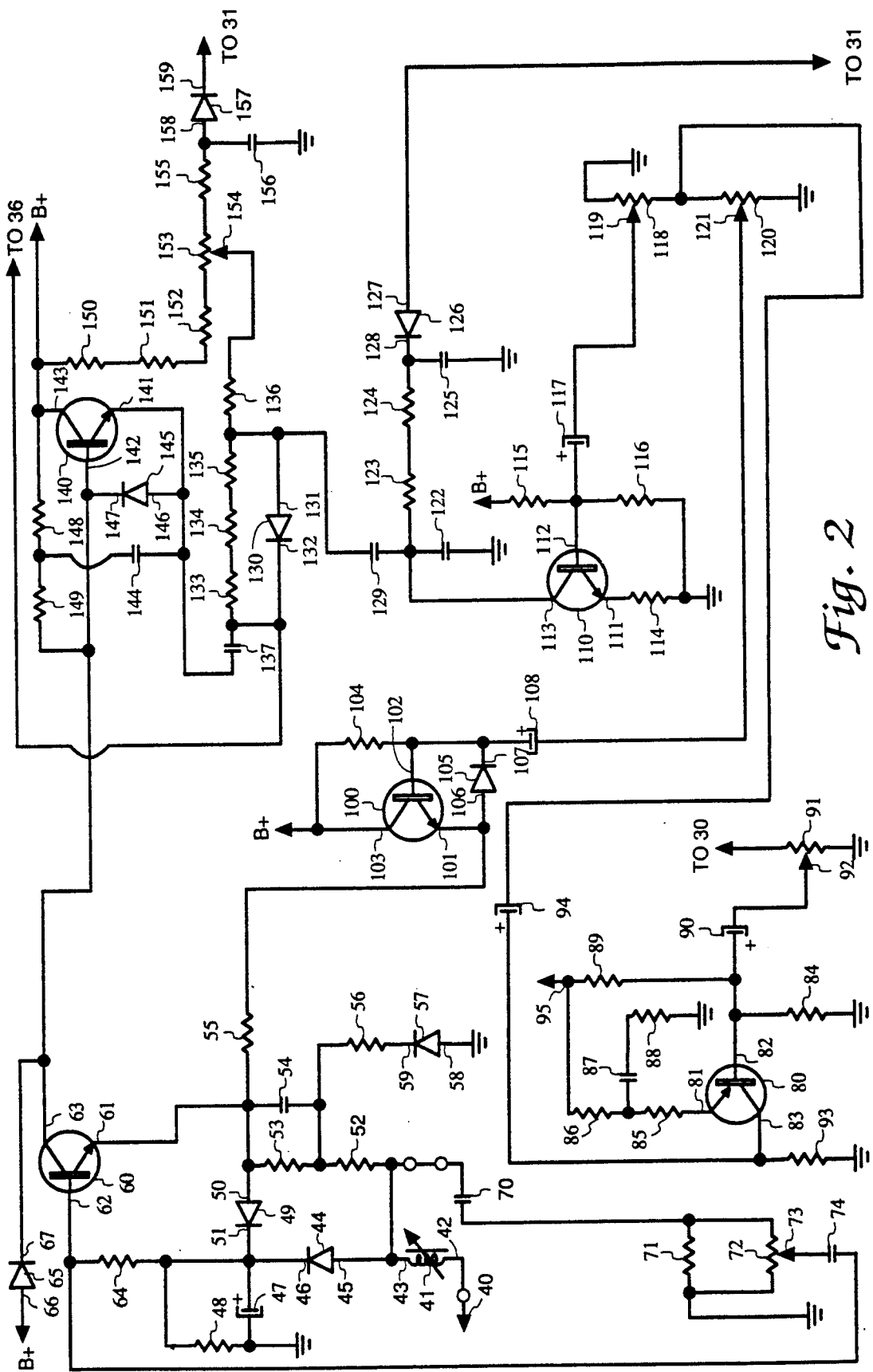
FIG. 2 sets forth a schematic diagram of the present invention dynamic focus system.

FIG. 2 sets forth a schematic diagram of dynamic focus system 35. A variable inductance coil 41 has one terminal 42 coupled to an input terminal 40 and a second terminal 43. Input terminal 40 is coupled to a source of negative polarity horizontal retrace signal within horizontal deflection system 31. A diode 44 has an anode 45 coupled to terminal 43 of inductor 40 and a cathode 46. A capacitor 47 and a resistor 48 are coupled in parallel between cathode 46 and ground. A diode 49 has an anode 50 and a cathode 51 coupled to cathode 46 of diode 44. A pair of resistors 52 and 53 are coupled in series between anode 50 and terminal 43 of inductor 41.

A capacitor 54 is coupled in parallel with resistor 53. A diode 57 has an anode 58 coupled to ground and a cathode 59 coupled to the junction of resistors 52 and 53 by a resistor 56. A capacitor 70 and a potentiometer 72 are series coupled between inductance terminal 43 and ground. Movable contact 73 of potentiometer 72 is coupled to base 62 of transistor 60 by a capacitor 74. A resistor 71 is coupled in parallel with potentiometer 72.

An NPN transistor 60 has an emitter electrode 61 coupled to anode 50, a base electrode 62 coupled to cathodes 51 and 46, and a collector electrode 63 coupled to a source of operating supply by a diode 65. A PNP transistor 80 has an emitter electrode 81 coupled to vertical yoke 23 by a series combination of resistors 85 and 86, a base electrode 82 coupled to ground by a resistor 84 and a collector electrode 83 coupled to ground by a resistor 93. A capacitor 87 and a resistor 88 are coupled in series between the junction of resistors 85 and 86 and ground. A resistor 89 is coupled between base 82 and vertical yoke 23 (seen in FIG. 1). A potentiometer 91 is coupled to a source of vertical saw signal within vertical deflection 30 (seen in FIG. 1). Potentiometer 91 further includes a movable contact 92 coupled to base 82 of transistor 80 by a capacitor 90.

An NPN transistor 100 includes an emitter electrode 101 coupled to emitter 61 of transistor 60 by a resistor 55, a base electrode 102 and a collector electrode 103 coupled to a source of operating supply. A resistor 104 is coupled between collector 103 and base 102. A diode 105 includes an anode electrode 106 coupled to emitter 101 and a cathode 107 coupled to base 102. A potentiometer 120 is coupled by capacitor 94 between collector 83 of transistor 80 and ground and includes a movable contact 121 coupled to base 102 of transistor 100 by a capacitor 108. A potentiometer 118 is coupled between potentiometer 120 and ground and includes a movable contact 119. An NPN transistor 110 includes an emitter electrode 111 coupled to ground by a resistor 114, a base electrode 112 coupled to movable contact 119 by a capacitor 117 and a collector electrode 113. A resistor 116 couples base 112 to ground while a resistor 115 couples base 112 to a source of operating supply. A capacitor 122 couples collector 113 to ground. A diode 126 has an anode 127 coupled to horizontal deflection system 31 (seen in FIG. 1) and a cathode 128 coupled to ground by a capacitor 125. A series combination of resistors 123 and 124 is coupled between collector 113 and cathode 128.

An NPN transistor 140 includes an emitter electrode 141, a base electrode 142 coupled to collector 63 of transistor 60, and a collector electrode 143 coupled to a source of operating supply. A series combination of resistors 148 and 149 are coupled between collector 143 and base 142 of transistor 140. A capacitor 144 is coupled between the junction of resistors 148 and 149 and emitter 141. A diode 145 has an anode 146 coupled to emitter 141 and a cathode 147 coupled to base 142. A capacitor 137 is coupled between emitter 141 and focus electrode 36 (seen in FIG. 1). A potentiometer 153 has one end coupled to collector 143 by a series combination of resistors 150, 151 and 152 and the other end coupled to horizontal deflection 31 by a resistor 155 and a diode 157. Potentiometer 153 further includes a movable contact 154 coupled to focus electrode 36 by a series combination of resistors 133, 134, 135 and 136. A diode 130 has an anode 131 coupled to the junction of resistors 135 and 136 and a cathode 132 coupled to the junction of capacitor 137 and resistor 133. A capacitor 129 is coupled between anode 131 and collector 113 of transistor 110. A capacitor 156 couples the junction of anode 158 of diode 157 to ground while cathode 159 of diode 157 is coupled to horizontal deflection system 31 (seen in FIG. 1).

Figure 3A:
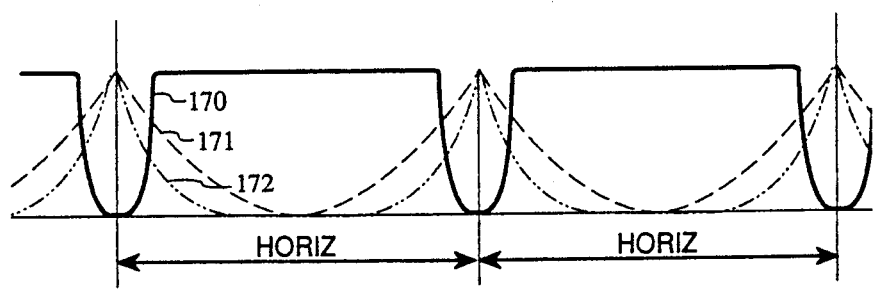
FIG. 3 sets forth a plurality of signal waveforms associated with the present invention dynamic focus system.

In operation, a negative going horizontal deflection flyback pulse is coupled to input terminal 40 from horizontal deflection system 31. The negative going horizontal flyback pulse is shown in FIG. 3A and referenced by numeral 170. As can be seen, flyback pulse 170 comprises a series of negative going pulse signals which in accordance with conventional fabrication techniques coincide with the retrace interval of the horizontal deflection system. Variable inductor 41 in combination with capacitor 70 integrates the negative going flyback pulses of waveform 170 to produce a horizontal rate parabolic signal shown in FIG. 3A as waveform 171. Resistor 56 and diode 57 cooperate to further process parabolic waveform 171 to form parabolic waveform 172 in FIG. 3A. As can be seen, waveform 172 defines generally sharper slope portions than parabolic waveform 171. Waveform 172 is coupled by the parallel network of resistor 53 and capacitor 54 to emitter 61 of transistor 60. In addition, waveform 171 is coupled to the peak detecting circuit formed by diode 44, capacitor 47 and resistor 48. The action of the peak detecting circuit thus formed produces a bias voltage which is coupled by resistor 64 to base 62 of transistor 60. The base voltage thus developed maintains class B operation to bias transistor 60 below cut off. A parabolic waveform 172 applied to emitter 61 is amplified by transistor 60 in class B operation which maximizes the signal handling capability of transistor 60 and which clips or flattens a portion of waveform 172 occurring during the horizontal retrace interval. Because signal is initially at B+ and can extend close to ground, maximum signal and minimum power dissipation are provided which exceeds that available in class A operation.

Figure 3B:
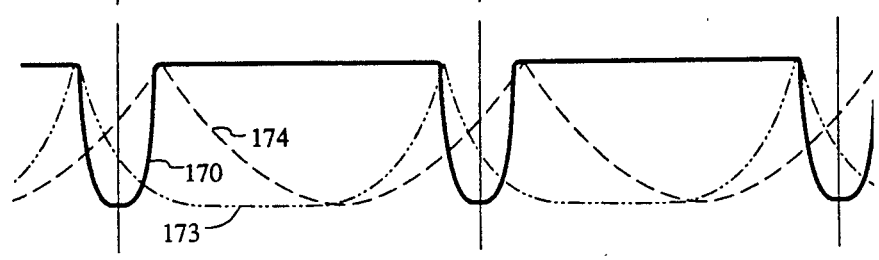
Figure 3C:
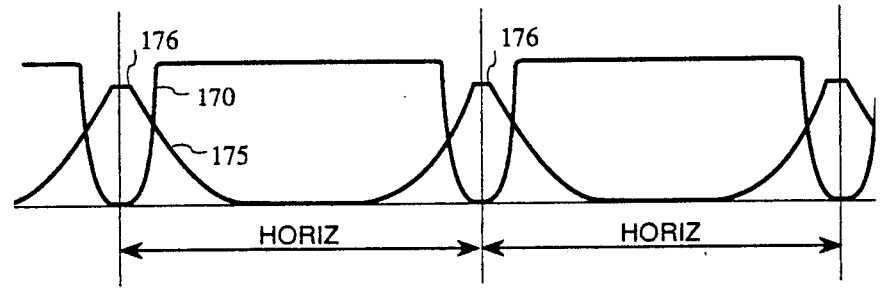

In addition to developing the above-described parabolic waveform, the action of inductor 41, capacitor 70 and resistor 71 also produces a horizontal rate sawtooth waveform across resistor 71. This horizontal sawtooth waveform is coupled via potentiometer 72 and capacitor 74 to base 62 of transistor 60. The addition of the horizontal rate sawtooth waveform to the parabolic waveform shown as waveform 172 in FIG. 3A changes the timing of the parabolic waveform at collector 63 with respect to horizontal retrace signal 170. This allows the horizontal parabola to be early or late with respect to the horizontal retrace signal. FIG. 3A shows the relative timing between parabolic waveform 172 and horizontal retrace signal 170 when potentiometer 72 is adjusted for centered or normal timing. As can be seen, waveform 172 is under such circumstances basically symmetrical with waveform 170. As potentiometer 72 is adjusted, the relative timing between parabolic waveform 172 and horizontal retrace signal 170 may be shifted to the extremes shown in FIG. 3B as parabolic waveforms 173 and 174. Thus, potentiometer 72 permits a relative change between left and right side focusing of CRT 11 and is therefore generally referred to as a left-right phase adjustment. The output of transistor 60 is coupled to base 142 of transistor 140. Transistor 140 is configured to form a boot-strapped emitter follower stage. The boot strap configuration of transistor 140 increases the signal amplitude which may be processed by the stage. FIG. 3C shows waveform 175 which is applied to base 142 of transistor 140. Also shown for reference in FIG. 3C is horizontal retrace signal 170. As mentioned above, transistor 60 is operated in a class B mode and thus clipped or flattened portions 176 appear in waveform 175. Because the flattened portions of waveform 175 occur during the horizontal retrace interval, they have no effect upon the active dynamic focus signal. However, the class B operation reduces power while increasing the effective horizontal parabola output voltage, and thus, substantially increases its signal handling capability. Thus, a greater parabolic waveform is available for focus activity. The emitter follower output of transistor 140 is coupled to focus electrode 36 of CRT 11 (shown in FIG. 1) by a capacitor 137.

The above-described signal processing results in applying a horizontal rate parabolic signal shown as waveform 175 in FIG. 3C to the focus electrode of the CRT. The amplitude of horizontal rate parabolic signal is adjusted by varying the inductance of inductor 41 while the phase adjustment for left to right control is provided by adjustment of potentiometer 72.

In accordance with an important aspect of the present invention, transistors 60 and 140 cooperate to increase the overall signal amplitude handling capability of the present invention system. The operation of transistors 60 and 140 is best understood by examining the first and second halves of waveform 175. During the initial portion of signal 175, a negative going signal is produced by transistor 60 conduction which is coupled to capacitor 137 by diode 145. During the second half of its period, waveform 175 is positive going and transistor 140 is turned on producing the above-referenced bootstrapped operation in which capacitor 144 effectively places resistors 148 and 149 in parallel. With resistors 148 and 149 in parallel, the effective load resistor in the collector circuit of transistor 60 is reduced to approximately one-half which increases the base drive to transistor 140. This cooperative action of transistors 60 and 140 produces a sharply sloped front edge for waveform 175 due to transistor 60 conduction and a sharply sloped back edge due to transistor 140 conduction. Resistors 148 and 149 may optimally be selected to operate transistor 40 beyond its operating supply and thus further clip or flatten the resulting parabolic signal and further increase the available dynamic focus voltage to be applied to focus electrode 36 of CRT 11 (seen in FIG. 1).

Figure 3D:
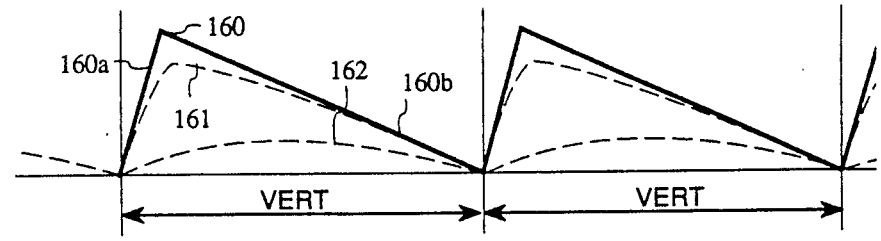
Figure 3E:
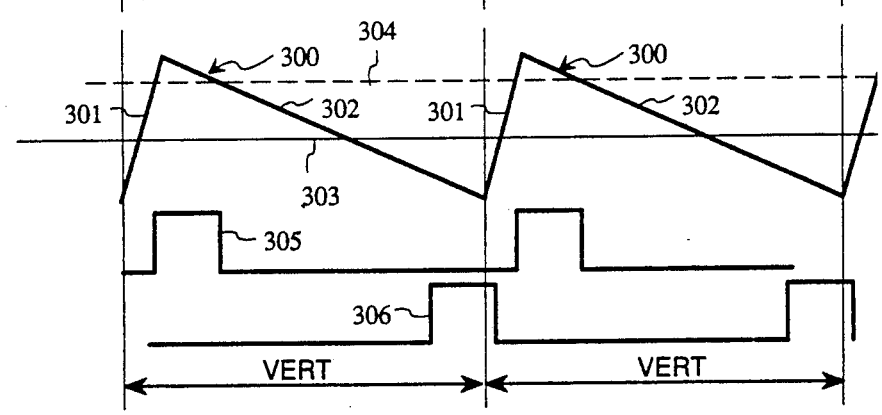
Figure 3F:
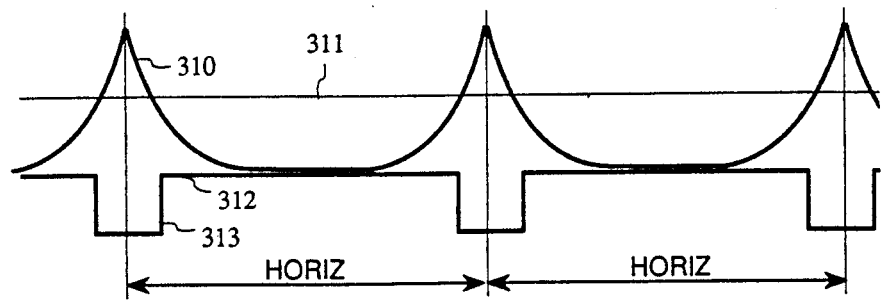

FIG. 3D sets forth the fundamental vertical scan rate waveforms utilized in the present invention dynamic focusing system. Waveform 160 comprises the basic vertical scan signal usually referred to as a saw voltage or saw wave signal due to its sharply rising initial portion 160A and its more gently sloped longer duration portion 160B. Portion 160A corresponds to the retrace interval of vertical scan while portion 160B corresponds to the scan portion of the vertical deflection cycle. Waveform 161 comprises a vertical rate signal having a saw wave voltage combined with a parabolic signal component. Waveform 162 comprises a vertical rate parabolic signal. With this understanding of the basic vertical rate signals, the top to bottom or vertical focus correction of the present invention system may now be explained.

Transistor 80 forms a summing amplifier. A saw wave signal such as waveform 160 in FIG. 3D is coupled to the top of potentiometer 91 from vertical deflection system 30 (seen in FIG. 1) by means not shown. A portion of vertical saw wave 160 is coupled to base 82 of transistor 80 via movable contact 92 and coupling capacitor 90. Concurrently, input terminal 95 is coupled to vertical yoke 23 to apply a combined vertical saw and parabolic signal such as waveform 161 to emitter 81 of transistor 80. Capacitor 87 provides a partial integration of the combined parabolic and saw wave signal applied to emitter 81 causing the parabolic component to be "tilted" or shifted in time. Because the input signals at base 82 and emitter 81 of transistor 80 have a subtractive effect upon the output signal produced at collector load resistor 93, the output waveform at collector 83 of transistor 80 comprises the parabolic waveform 162 shown in FIG. 3D. It should also be noted that the timing of output waveform 162 may be altered by adjusting potentiometer 91 which varies the amount of vertical saw waveform applied to transistor 80. Thus, potentiometer 91 provides a top to bottom phase adjustment or balance control. In accordance with an important aspect of the present invention, the simultaneous processing of vertical saw and vertical yoke signals develops the vertical rate parabolic signal required for dynamic focusing in an efficient, simple and cost effective manner.

The vertical rate parabolic output signal of transistor 80 is coupled via coupling capacitor 94 to a pair of potentiometers 120 and 118. A portion of the vertical rate parabolic signal applied to potentiometer 120 is coupled via movable contact 121 and coupling capacitor 108 to base 102 of transistor 100. As previously described, a portion of the horizontal saw wave signal at potentiometer 72 is coupled to base 62 and the horizontal parabola is coupled to emitter 61 of transistor 60. In a similar fashion, the vertical rate parabolic signal coupled to base 102 is also coupled to emitter 61 of transistor 60 via transistor 100. Thus, transistor 60 processes both horizontal and vertical rate focus signals in such a way as to modulate the amplitude of the horizontal parabola produced at collector 63 over the vertical scan. The modulated parabolic signal at collector 63 of transistor 60 is thereafter coupled by emitter follower stage 140 to focus electrode 36 of CRT 11 by coupling capacitor 37. This results in a larger horizontal parabola at the top and bottom than across the center of the screen providing a greater horizontal focus correction at the corners than along the left and right edges. The degree of modulation over the vertical scan to the horizontal rate parabolic signal applied to focus electrode 36 is controlled by adjustment of potentiometer 120.

Concurrently, the vertical rate parabolic signal coupled to potentiometer 118 is applied via movable contact 119 and coupling capacitor 117 to base 112 of transistor 110. Transistor 110 is a common emitter amplifying stage and thus the parabolic waveform at base 112 is amplified and inverted at collector 113. The output vertical parabolic signal at collector 113 is coupled to anode 131 of diode 130 by a coupling capacitor 129. In addition, the above described static or center focus DC voltage is coupled to anode 131 by focus potentiometer 153, movable contact 154 and resistor 136. Thus, diode 130 has a vertical rate parabolic signal and DC focus voltage applied to anode 131 and a composite horizontal and vertical focus signal applied to cathode 132. In accordance with an important aspect of the present invention, diode 130, resistors 133 through 135 and capacitors 137 and 129 together with focus potentiometer 153 provide a diode clamp driven with composite horizontal and vertical rate signals at one side and vertical rate signal alone at the other side. Thus, a larger amplitude signal is available than would be available with a single supply and minimizes the supply voltage for the horizontal parabola. Anode 131, in essence, "floats" or varies at the vertical rate around the DC level established by potentiometer 153. The horizontal parabola coupled to focus electrode 36 via capacitor 137 is clamped to this DC level which is varying at the vertical rate. As a result, no change of center focus voltage results from the amplitude of the horizontal parabolic signal. This simplifies the focus setup of the display monitor because the DC center focus adjustment performed at potentiometer 153 is independent of the horizontal dynamic correction.

Thus, adjustment of potentiometer 153 provides the static or center focus of the present invention system while adjustment of potentiometer 118 provides a vertical amplitude adjustment or adjustment of potentiometer 91 provides a vertical phase or balance adjustment. In addition, adjustment of potentiometer 120 provides a "corner gain" horizontal and vertical amplitude adjustment.

What has been shown is an effective, cost efficient dynamic focus system. The system shown includes several novel circuit designs which cooperatively interact to provide an improved performance dynamic focus system.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. For use in a cathode ray tube display having a display screen, an electron beam source directed at the display screen, horizontal and vertical deflection systems for producing respective horizontal and vertical deflection signals, a vertical and horizontal deflection yoke for receiving the deflection signals and for scanning the electron beam across the screen and a focus electrode for receiving a focus signal used to focus the electron beam, a focus system comprising:
   a clamp circuit having a first terminal coupled to the focus electrode and a second terminal;
   a source of DC potential coupled to said second terminal;
   a source of vertical deflection rate parabolic signals;
   a source of horizontal deflection rate parabolic signals;
   a composite signal amplifier having an input coupled to said sources of vertical and horizontal deflection rate parabolic signals and an output coupled to said first terminal of said clamp circuit; and
   a vertical signal amplifier having an input coupled to said source of vertical deflection rate parabolic signals and an output coupled to said second terminal of said clamp circuit.

2. A focus system as set forth in claim 1 wherein said clamp circuit further includes a first coupling capacitor coupled between said output of said composite signal amplifier and said first terminal of said clamp circuit.

3. A focus system as set forth in claim 2 wherein said clamp circuit further includes a second coupling capacitor coupled between said output of said vertical signal amplifier and said second terminal of said clamp circuit.

4. A focus system as set forth in claim 3 wherein said clamp circuit includes a diode having an anode coupled to said second terminal and a cathode coupled to said first terminal.

5. A focus system as set forth in claim 4 wherein said clamp circuit includes a resistive impedance coupled between said first and second terminals.

6. A focus system as set forth in claim 1 wherein said source of vertical deflection rate signals includes an amplifier having an output coupled to said vertical amplifier and said composite signal amplifier, a first input coupled to the vertical deflection system and a second input coupled to said vertical deflection yoke.

7. A focus system as set forth in claim 6 wherein said amplifier includes a transistor having an emitter, base and collector in which said collector forms said output and said base and emitter form said first and second inputs respectively.

8. A focus system as set forth in claim 7 wherein said amplifier includes a potentiometer for varying the input amplitude to said first input.

9. A focus system as set forth in claim 1 wherein said composite signal amplifier includes:
   a common base transistor amplifier stage having a first emitter coupled to said sources of horizontal and vertical deflection rate parabolic signals, a first base and a first collector; and
   a boot-strapped emitter follower transistor amplifier stage having a second base coupled to said first collector, a second emitter coupled to said first terminal of said clamp circuit and a second collector, a capacitor coupled between said second collector and said second emitter, and a diode having a cathode coupled to said second base and an anode coupled to said second emitter.

10. A focus system as set forth in claim 9 wherein said composite signal amplifier includes a peak detecting circuit coupled to said source of horizontal deflection rate parabolic signals and said first base for producing a signal bias voltage which biases said common base transistor amplifier in a class B operation.

11. A focus system as set forth in claim 8 wherein said composite signal amplifier includes:
   a common base transistor amplifier stage having a first emitter coupled to said sources of horizontal and vertical deflection rate parabolic signals, a first base and a first collector; and
   a boot-strapped emitter follower transistor amplifier stage having a second base coupled to said first collector, a second emitter coupled to said first terminal of said clamp circuit and a second collector, a capacitor coupled between said second collector and said second emitter, and a diode having a cathode coupled to said second base and an anode coupled to said second emitter.

12. A focus system as set forth in claim 11 wherein said composite signal amplifier includes a peak detecting circuit coupled to said source of horizontal deflection rate parabolic signals and said first base for producing a signal bias voltage which biases said common base transistor amplifier in a cut-off condition.

13. A focus system as set forth in claim 9 wherein said source of vertical deflection rate signals includes an amplifier having an output coupled to said vertical amplifier and said composite signal amplifier, a first input coupled to the vertical deflection system and a second input coupled to said vertical deflection yoke.

14. A focus system as set forth in claim 13 wherein said amplifier includes a transistor having an emitter, base and collector in which said collector forms said output and said base and emitter form said first and second inputs respectively.

15. A focus system as set forth in claim 14 wherein said amplifier includes a potentiometer for varying the input amplitude to said first input.

* * * * *